Patented Oct. 17, 1939

2,176,509

UNITED STATES PATENT OFFICE 2,176,509

SOLID AND SEMISOLID LUBRICATING COMPOSITION

George L. Neely, Frank W. Kavanagh, and Bruce B. Farrington, Berkeley, Calif., assignors to Standard Oil Company of California, San Francisco, Calif., a corporation of Delaware No Drawing. Application May 20, 1935, Serial No. 22,434

20 Claims. (Cl. 87—9)

This invention relates to the manufacture of solid and semi-solid lubricating compositions effective in reducing friction and in lowering metal wear rates in bearings and journals subjected to high loads and to high frictional stresses.

The inadequacy of grease lubricating films in reducing friction and in lowering metal wear rates is very often recognized and appreciated, but is in many familiar lubricating services either overlooked entirely or allowed to remain neglected. It is well recognized, for example, that the inadequate lubrication of steel plate and rod mill roll journals or "necks" is the cause of high power consumption and high metal replacements; frictional losses alone are here so usual and so difficultly overcome that they have been estimated as responsible for from 50 to 80 percent of the power consumed in roll mill operation; also, it is well appreciated that the quality of the steel plate and rod is adversely influenced by deficiencies in roll neck lubrication. It is less often appreciated, however, that the faulty lubrication of such ordinary parts as automobile spring shackles and chassis points generally entails high frictional loss and metal wear rates, principally because power losses in such relatively moving parts are seldom measured and because metal replacement costs are in any case small.

It is a purpose of our invention to disclose and provide lubricating compositions which reduce materially the frictional power losses ordinarily suffered in the lubrication of metal surfaces subjected to high loads or to extreme shocks and stresses, or both. More generally, it is a purpose of our invention to disclose and provide lubricants, usually solid or semi-solid, which markedly lower the coefficients of friction between relatively moving metal parts and which are of high utility in the lubrication of any metal surfaces whose relative motion is the cause of high bearing wear and high bearing friction, whether such surfaces are called upon to operate at high or at ordinary temperatures.

We have found that the incorporation into the ordinary solid or semi-solid lubricating greases of the art, of material but nevertheless small amounts of the water-soluble carbohydrates (namely, the mono-saccharides, of which dextrose is an example; the di-saccharides, of which sucrose is an example; and the water-soluble starch degradation products, of which dextrine is an example), in finely divided solid form, remarkably reduces the rates of metal wear and remarkably lowers the frictional temperature rise of journals and bearings, and our invention lies in the manufacture and employment of solid and semi-solid lubricating compositions containing these added water-soluble, oil-insoluble solid carbohydrates for lowering the frictional temperatures of bearings and journals and, more generally, for decreasing the rates of metal wear and the coefficients of friction of relatively moving metal surfaces.

The lubricants of our invention may be of any desired consistency or hardness, and may be compounded of such kinds and proportions of mineral lubricating oils and soaps or combinations of soaps as may be most suitable for the particular service to which the finished lubricant is to be put. Our invention does not relate to particular soaps, whether soda, lime, or aluminum, or combinations of the same, nor to particular proportions of such soaps as thickeners or solidifiers of mineral oils in the preparation and use of greases for particular and limited services. Without regard to particular kinds and proportions of soaps or mineral lubricating oils, our invention is concerned with the reduction of friction and the temperatures due to friction, in any and all types of semi-solid and solid lubricants, by the incorporation of the above designated oil-insoluble substances therein in solid form. And, as will be fully exemplified hereinbelow, the benefits derived from the addition of these agents may be obtained in the entire absence of soaps of any kind.

In order to acquaint those skilled in the art with the benefits to be derived from the practice of our invention, we give below particular examples of the effects brought about thereby in the lubrication of various markedly different types of particularly severe services.

*Example 1.*—A typical cold-made high melting point soda grease of the present art, designed to lubricate steel plate roll mill hot necks, is composed about as follows:

Grease A

| | Per cent by weight |
|---|---|
| High melting point tallow | 18.7 |
| Pennsylvania steam refined cylinder oil | 71.3 |
| Lump caustic soda | 5.0 |
| Water | 5.0 |

To such a solid high melting point grease we add about one-ninth of its weight of ordinary powdered sugar (sucrose) incorporated in the grease during the ordinary course of its manufacture, while still in a plastic state, in the same manner as other solids, such as graphite, are incorporated in such products. The product then contains about 10% of its weight of powdered sugar, as follows:

Grease B

| | Per cent by weight |
|---|---|
| High melting point tallow | 16.8 |
| Pennsylvania steam refined cylinder oil | 64.2 |
| Powdered sugar | 10.0 |
| Lump caustic soda | 4.5 |
| Water | 4.5 |

These two lubricants, greases A and B, were employed to lubricate the journals of steel on bronze bearings similar to the "hot necks" of steel plate rolling mills, in tests during which the unit loading was 4,000 pounds per square inch and the rubbing speed was 44 ft., per minute. In all of the tests, the greases were fed by hand in such quantities as to provide an over-supply, and in these tests no external heat was applied, all heat generated being due entirely to friction.

After about 40 minutes' operation with grease A, the temperature rise due to friction, as measured by the temperature of the journal bearings, had reached an equilibrium at about 350° F. above atmospheric, and remained at that point, plus or minus about 10° F., indefinitely.

Following the feeding of grease A, grease B was introduced without altering feed or load, and without beringing the moving surfaces to rest. The temperature of the bearings dropped abruptly, and after about 15 minutes' operation (during part of which time grease A was being replaced by grease B in the lubricated parts themselves) the temperature was lowered to about 210° F. above atmospheric, and remained at that point, plus or minus about 5° F., indefinitely.

After the operation had continued with grease B for some time, grease A was again introduced, and again, after about 30 minutes during which grease B was being replaced and during which the bearing temperature rose abruptly, the temperature reached and remained at about 355° F. above atmospheric.

In many cases, the roll necks of plate and rod rolling mills are cooled with water, and we have found that the addition of graphite to a product such as grease B, above, effectively waterproofs it and renders operation in the said water cooled necks entirely satisfactory. Upon the addition of about one-tenth of its weight of graphite, a grease such as grease B is then composed about as follows:

Grease C

| | Per cent by weight |
|---|---|
| High melting point tallow | 15.0 |
| Pennsylvania steam refined cylinder oil | 57.0 |
| Powdered graphite | 10.0 |
| Powdered sugar | 10.0 |
| Lump caustic soda | 4.0 |
| Water | 4.0 |

The reductions in temperatures of the bearings, by the application of grease C, were similar to those brought about by grease B.

In the use of grease C we have found no particular friction reducing effect attributable to the graphite; as in the case of grease B, the friction reduction (when compared to grease A) appeared due entirely to the powdered sugar content, and the graphite served merely to protect the surface film in the presence of water.

The external heat applied in roll mill operation is of no detrimental effect to products containing our added sugar; on the contrary, the journal friction is lowered to a degree corresponding to the lowering shown above for operation in the absence of externally applied heat. In commercial steel mill operation, the greases shown above as grease B and grease C have substantially reduced power losses due to friction, have lengthened the life of the necks and brasses, and have materially reduced lubricant costs.

In order to illustrate the effects of the addition of various amounts of the solid friction-reducing agents of our invention, upon incorporation into greases of the type discussed, we have prepared cold-made high melting point soda greases such as grease A, above, but containing 2.0, 5.0 and 20.0 per cent of sucrose, as well as the 10.0 percent of sucrose shown in greases B and C, above. In this particular set of test runs, the use of grease A, under conditions similar to those detailed above, caused the journals to rise to a temperature of 360° F. above atmospheric. The tabulation below shows the frictional temperature rises above atmospheric caused by the introduction into grease A of the designated amounts of sucrose (ordinary powdered sugar), and it is to be noted that upon repeating the introduction of grease A into the bearings, between the application of the several sugar-containing products, the bearing temperatures again rose to a point about 360° F. above atmospheric.

| | Frictional temperature rise, °F. above atmospheric |
|---|---|
| Grease A | 360 |
| Grease A, but + 2.0% sucrose | 250 |
| Grease A, but + 5.0% sucrose | 220 |
| Grease A, but + 10.0% sucrose | 200 |
| Grease A, but + 20.0% sucrose | 215 |

From these results, and others, we conclude that the addition of very small amounts of these substances are effective, and while we prefer to employ from 2 per cent to 10 or more per cent of the added substance, on the basis of the whole grease, it will be obvious that amounts either lower or higher than these preferred amounts are included within the operable limits of our invention.

Likewise, in order to illustrate the effects of the addition of various other agents of the character defined hereinabove, we show the following tabulation, in which the same amounts of sucrose, dextrose and dextrine, representative of the substances which we have found suitable for the designated purposes, are incorporated in a grease of the type of grease A, above. The conditions of the test runs during the series shown in the tabulation were similar to those detailed above.

| | Frictional temperature rise, °F. above atmospheric |
|---|---|
| Grease A | 360 |
| Grease A, but + 10% dextrose | 215 |
| Grease A, but + 10% sucrose | 200 |
| Grease A, but + 10% dextrine | 230 |

That the benefits to be derived from the incorporation of the solid finely divided water-soluble, oil-insoluble friction-reducing agents of our invention are by no means confined to lubricating operations carried out at high temperatures, but that they are, in fact, to be expected in a great variety of services under very diverse conditions, is apparent from the following:

*Example 2.*—A typical automobile chassis lubricant of the grease type is composed of a boiled lime-fatty acid soap, with or without the glyceride resulting from glyceride soap stock hydrolysis, with which has been admixed a mineral lubricating oil; generally such a grease contains between 5 and 15% by weight of such soap and from 0.5 to 2.0% by weight of water, the remainder being mineral oil of 200 to 500 seconds Saybolt viscosity at 100° F. Such chassis lubricants operate in the cold, but are called on to withstand sudden and intermittent severe shocks and stresses in spring shackles, steering gear housings, universal joints, and the like. Under the ordinary circumstances of their operation, the friction and wear reducing characteristics of chassis lubricants are not brought into question: the parts are presumbly sufficiently lubricated if a film or a supply of grease to provide a film, is apparent or available.

An artificially loaded and mechanically operated simulation of a spring shackle, however, provides a striking demonstration of the effectiveness of the lubricants of our invention in decreasing the friction between such moving parts, thereby reducing wear and increasing the life as well as the freedom of motion in such parts. One such simulated shackle is comprised of a spring-loaded conventional steel or bronze pin and bushing shackle, in which the pin is mounted on knife edges free to rock, and is rigidly connected by means of a torque arm to the diaphragm of a positive displacement unidirectionally-valved pump; the spring-loaded bushing is oscillated mechanically, and the frictional force generated in the bearing by such oscillation tends to rock the pin and build up pressure in the valved pump; thus directly translating frictional drag in the bearing into hydrostatic pressure which may be measured and recorded, as desired, for, in the uniform and continuous operation of such a device, the pressure ultimately reached remains constant and is determined solely by the friction reducing characteristics of the lubricating composition under test. Another such simulated shackle is comprised of a conventional steel on steel threaded spring shackle, spring-loaded and mounted as described above. A typical chassis lubricant of the type discussed above, namely, a stearic acid-oleic acid boiled lime grease containing about 90% by weight of 300 viscosity oil (Saybolt Universal at 100° F.), was tested in a steel on bronze pin and bushing spring shackle device of the type described, after which another sample of the same grease, but into which about one-tenth of its weight of powdered sugar (sucrose) had been worked by mere mechanical admixture in the cold, was also tested: the relative friction, as shown by the pressure built up and recorded as hydrostatic head, was reduced to about one-third by the presence of the sugar in the composition.

This boiled lime grease was also tested in a second steel on bronze pin and bushing shackle, and in a steel on steel threaded shackle, both mounted as described above; the lime grease was tested alone, again containing 2.0% by weight of powdered sugar, again containing 5.0% by weight of powdered sugar; and again containing 2.0% by weight of very finely divided graphite. The results of these tests are shown in the table below, in which the open figures record the pressure in pounds built up as hydrostatic head and in which the figures enclosed in parentheses are calculated as relative friction, with the lime grease alone represented as 100:

|  | Steel on steel threaded shackle | | Steel on bronze pin and bushing shackle | |
| --- | --- | --- | --- | --- |
|  | Pressure | Relation | Pressure | Relation |
| Lime grease, alone | 88 | (100) | 52 | (100) |
| Lime grease plus 2.0% sugar | 65 | (74) | 45 | (87) |
| Lime grease plus 5.0% sugar | 60 | (68) | 45 | (87) |
| Lime grease plus 2.0% graphite | 94 | (107) | 54 | (104) |

We have described the addition of our friction-reducing agents largely with respect to the usual solid and semi-solid lubricating greases of the art, that is, with respect to soap-thickened lubricating compositions. We have found, however, that the utility of these agents is not to be confined to soap-bodied greases, but that lubricants in which soaps of any kind are entirely absent are likewise benefitted, and to a degree comparable with the benefits shown above. For example:

*Example 3.*—An anhydrous, purified petrolatum was tested in the steel on steel threaded shackle and in the steel on bronze pin and bushing shackle described, both alone and with the addition of 2.0% by weight of powdered sugar (sucrose) thereto. The results of these tests are shown in the tabulation, in which, as before, the open figures record the pressure in pounds built up as hydrostatic head and the figures in parentheses are calculated as relative friction, with the petrolatum represented as 100:

|  | Steel on steel threaded shackle | | Steel on bronze pin and bushing shackle | |
| --- | --- | --- | --- | --- |
|  | Pressure | Relation | Pressure | Relation |
| Petrolatum, alone | 100+ |  | 70 | (100) |
| Petrolatum plus 2.0% sugar | 46 | (<46) | 44 | (63) |

(In the steel on steel threaded shackle, the use of petrolatum alone caused the pressure to exceed the limit of the recording device employed, which limit was 100 pounds; the relative friction shown for petrolatum containing 2.0% by weight of sugar cannot, therefore, be accurately shown, and it is merely known that this relative friction was less than 46, as indicated.)

As will be apparent, the agents incorporated into the lubricants of our invention are for the most part in solid phase, and the texture and appearance of the ordinary lubricants corresponding thereto is altered accordingly. Generally, these agents decrease somewhat both the consistence and the melting point of the corresponding greases of the present art. Consequently, if melting point or consistence is of importance, we prefer to employ the lowest amounts of these agents that will provide the desired effects. In the event that graphite as well as a solid agent of this type is employed, an improvement in texture of the ordinary graphite greases will be noticed: the friction-reducing agent, in finely divided form, will be found to materially smooth out, or "homogenize" the granular graphite greases of the present art.

We find in general that our solid friction-reducing agents, preferably in finely divided form, may be incorporated in the lubricants in the same manner as certain other solid constituents (for example, graphite, talc, and the like) are often incorporated in such compositions. Thus, in the preparations of cold made soda greases, in which the saponifying base is added together with water to a stirred admixture of mineral oil and melted or warmed fat or fatty acid, we merely add the solid agent slowly during the course of the addition of the base, or, if the rate of thickening permits, at any time thereafter, so long as good dispersion of the finely divided solid may be effected prior to the final setting up of the product. In the manufacture of boiled greases, either of the lime or soda soap type, we add the solid agent toward the latter end of the oil addition, while good dispersion can easily be obtained due to the plastic state of the grease; on occasion, however, when the consistency of the product permits, we merely work in the agent mechanically, subsequent to the usual grease manufacturing steps and while the products themselves are at ordinary temperatures. If graphite is employed in addition to the agent, which we have found to be highly desirable in the event that any of our products are expected to come into contact with water, we ordinarily add the agent and such graphite at the same time, although, since there seems no union, either chemical or physical, between the agent and graphite, these substances may be added separately, as convenient.

As has been said, the agents which we incorporate into solid and semi-solid lubricating compositions for the purposes mentioned, are all solids, and are water-soluble and oil-soluble. We note that we have tested various water-insoluble substances, of such diverse character as talc, graphite and starch (flour), without observing any benefits in friction reduction or metal wear rates.

We have no definitely acceptable theory to offer for the success of our products in reducing friction and power losses and in increasing the length of life of the lubricated surfaces: We do not, therefore, wish to be limited by any theory which, at a more advanced stage in the development of the art, might prove untenable. We merely know that the introduction of our added agents, in finely divided solid form, to a great variety of compositions, as shown, does in fact cause such friction reduction and does in fact lead to long life of metal parts, and we base our teaching on such actual findings alone.

In the appended claims defining our invention, the term "solid" is to be understood as characterizing compositions which do not flow freely as liquids at ordinary atmospheric temperatures and thus distinct therefrom.

We claim:

1. A solid metal-to-metal friction-reducing lubricating composition comprising a hydrocarbon lubricant and a solid water-soluble, oil-insoluble carbohydrate dispersed therein in solid form.

2. A solid metal-to-metal friction-reducing lubricating composition comprising a hydrocarbon lubricant, containing between about two and about twenty percent by weight of a solid water-soluble, oil-insoluble carbohydrate dispersed therein in solid form.

3. A metal-to-metal friction-reducing lubricant comprising a soap-bodied mineral oil and a solid water-soluble, oil-insoluble carbohydrate dispersed therein in solid form.

4. A metal-to-metal friction-reducing lubricant comprising a soda soap-bodied mineral oil, and a solid water-soluble, oil-insoluble carbohydrate dispersed therein in solid form.

5. A metal-to-metal friction-reducing lubricant comprising a lime soap-bodied mineral oil, and a solid water-soluble, oil-insoluble carbohydrate dispersed therein in solid form.

6. A metal-to-metal friction-reducing lubricant comprising a petrolatum and a solid water-soluble, oil-insoluble carbohydrate dispersed therein in solid form.

7. A solid metal-to-metal friction-reducing lubricating composition comprising a hydrocarbon lubricant, a solid water-soluble, oil-insoluble carbohydrate dispersed therein in solid form, and graphite.

8. A metal-to-metal friction-reducing lubricating composition comprising a soap-bodied mineral oil, a solid water-soluble, oil-insoluble carbohydrate dispersed therein in solid form, and graphite.

9. A solid metal-to-metal friction-reducing lubricating composition comprising a hydrocarbon lubricant containing between about two and about twenty weight percent of dextrose dispersed therein in solid form.

10. A solid metal-to-metal friction-reducing lubricating composition comprising a hydrocarbon lubricant containing between about two and about twenty weight percent of sucrose dispersed therein in solid form.

11. A solid metal-to-metal friction-reducing lubricating composition comprising a hydrocarbon lubricant containing between about two and about twenty weight percent of dextrine dispersed therein in solid form.

12. A metal-to-metal friction-reducing lubricating composition consisting of a soap-bodied mineral oil and a solid water-soluble, oil-insoluble carbohydrate dispersed therein in solid form.

13. A metal-to-metal friction-reducing lubricating composition consisting of a soap-bodied mineral oil and solid dextrose dispersed therein in solid form.

14. A metal-to-metal friction-reducing lubricating composition consisting of a soap-bodied mineral oil and solid sucrose dispersed therein in solid form.

15. A metal-to-metal friction-reducing lubricating composition consisting of a soap-bodied mineral oil and solid dextrine dispersed therein in solid form.

16. A solid metal-to-metal friction-reducing lubricating composition comprising a solid hydrocarbon lubricant containing between about two and about ten percent by weight of a solid water-soluble, oil-insoluble carbohydrate dispersed therein in solid form.

17. A solid metal-to-metal friction-reducing lubricating composition comprising a solid hydrocarbon lubricant containing about ten percent by weight of a solid water-soluble, oil-insoluble carbohydrate dispersed therein in solid form.

18. A process of reducing friction between relatively moving metal parts which comprises applying to the metal parts a hydrocarbon lubricating composition containing a solid water-soluble, oil-insoluble carbohydrate dispersed therein in solid form.

19. A process as in claim 18, in which the hydrocarbon lubricating composition contains between about two and about twenty percent by weight of the solid water-soluble, oil-insoluble carbohydrate.

20. A process of reducing friction between relatively moving metal parts which comprises applying to the metal parts a solid composition consisting of a soap-bodied mineral oil and a dispersed solid water-soluble, oil-insoluble carbohydrate.

GEORGE L. NEELY.
FRANK W. KAVANAGH.
BRUCE B. FARRINGTON.